US012693630B2

(12) United States Patent
Coudray

(10) Patent No.: US 12,693,630 B2
(45) Date of Patent: Jul. 28, 2026

(54) MOVEMENT FOR TIMEPIECE AND TIMEPIECE

(71) Applicant: TEC EBAUCHES SA, Vallorbe (CH)

(72) Inventor: Eric Coudray, Foncine-le-Haut (FR)

(73) Assignee: TEC EBAUCHES SA, Vallorbe (CH)

( * ) Notice: Subject to any disclaimer, the term of this patent is extended or adjusted under 35 U.S.C. 154(b) by 284 days.

(21) Appl. No.: 18/575,249

(22) PCT Filed: Jun. 29, 2022

(86) PCT No.: PCT/EP2022/067973
§ 371 (c)(1),
(2) Date: Dec. 28, 2023

(87) PCT Pub. No.: WO2023/275184
PCT Pub. Date: Jan. 5, 2023

(65) Prior Publication Data

US 2024/0329599 A1 Oct. 3, 2024

(30) Foreign Application Priority Data

Jun. 30, 2021 (EP) .................................... 21182792

(51) Int. Cl.
*G04B 17/28* (2006.01)
*G04B 45/00* (2006.01)

(52) U.S. Cl.
CPC ......... *G04B 17/28* (2013.01); *G04B 45/0061* (2013.01)

(58) Field of Classification Search
CPC .... G04B 17/28; G04B 45/0061; G04B 1/165; G04B 17/285
See application file for complete search history.

(56) References Cited

U.S. PATENT DOCUMENTS

2008/0192583 A1* 8/2008 Buttet .................... G04B 19/26 368/127
2013/0155820 A1* 6/2013 Rochat ................... G04B 17/28 368/128
2018/0284696 A1* 10/2018 Bazin ....................... G04B 1/12

FOREIGN PATENT DOCUMENTS

EP 2802944 B1 6/2016
EP 3543797 B1 1/2021
WO WO-2020007619 A2 1/2020

OTHER PUBLICATIONS

International Search Report for International Application No. PCT/EP2022/067973 mailed on Oct. 4, 2022 and English translation thereof.

(Continued)

*Primary Examiner* — Sean Kayes
(74) *Attorney, Agent, or Firm* — Harness, Dickey & Pierce, P.L.C.

(57) ABSTRACT

The present invention relates to a watch-movement comprising a counting assembly comprising a first energy source and a gear train kinematically connected to at least one time indicator; and a regulating assembly comprising a regulating organ. This watch-movement is characterised in that it further comprises a locking member for the gear train; a mobile assembly carrying the regulating assembly; a guiding assembly for the mobile assembly comprising at least one rail; a drive mechanism for the mobile assembly arranged to move this mobile assembly along the guiding assembly; and a release mechanism for the locking member.
The invention also relates to a watch comprising such a watch-movement.

15 Claims, 10 Drawing Sheets

(56) References Cited

OTHER PUBLICATIONS

Written Opinion of the International Search Authority for International Application No. PCT/EP2022/067973 mailed on Oct. 4, 2022 and English translation thereof.

* cited by examiner

MOVEMENT FOR TIMEPIECE AND TIMEPIECE

CROSS-REFERENCE TO RELATED APPLICATIONS

This application is a national phase under 35 U.S.C. § 371 of PCT International Application No. PCT/EP2022/067973 which has an International filing date of Jun. 29, 2022, which claims priority to European Application No. 21182792.8, filed Jun. 30, 2021, the entire contents of each of which are hereby incorporated by reference.

TECHNICAL FIELD

The present invention relates to the field of mechanical watchmaking. More particularly, it relates to a watch-movement for a timepiece comprising a mobile regulating mechanism.

More specifically, this invention relates to a movement for a timepiece comprising a counting assembly comprising a first energy source and a gear train kinematically connected to at least one time indicator, said counting assembly being part of a first kinematic chain; and a regulating assembly comprising a regulating organ and being part of a second kinematic chain distinct from the first kinematic chain.

The invention also relates to a timepiece comprising such a movement.

PRIOR ART

For a long time now, watch movements have been equipped with at least one tourbillon or carousel-type regulating mechanism. These regulating mechanisms were designed to improve the isochronism of the watch movement by making it less sensitive to its position. More specifically, the regulating mechanism causes the balance wheel to move over time so that it occupies different positions. The average of the isochronism errors as a function of the position of the balance wheel is, in principle, closer to zero than the isochronism errors in a given position of the movement.

Tourbillon or carousel-type regulating mechanisms were originally developed for pocket watches, which are generally kept in a vertical position. Such regulation mechanisms are less relevant for wristwatches, where the position often changes according to the movements of the wearer of the watch.

In order to take account of the wearer's variable movements and of the changes in the position and orientation of the watch, various watch-movements have been developed containing, for example, two or even three tourbillons moving along different axes, for example orthogonal axes. In these designs, each tourbillon has a balance wheel, the position of whose axes is fixed during the operation of the tourbillon.

There are also movements with a single balance wheel supported by a regulating mechanism that moves this balance wheel along non-parallel axes. The axis of the balance moves along a cone in the known designs based on this principle. There is also a watch-movement comprising a balance wheel supported by a regulating mechanism which moves the axis of this balance wheel along a sphere.

In all cases, the range of positions reached by the axis of the balance is quite limited and corresponds to a geometric locus. As a result, this displacement cannot be freely chosen.

There is no watch-movement that allows the balance to be moved to a position and orientation freely chosen by the movement designer. As a result, the various regulating mechanisms have a relatively similar appearance.

It is therefore interesting to develop a watch-movement in which the balance wheel can move to any position chosen by the movement designer, without these movements being restricted to geometric locus such as straight lines, cones or parts of spheres in particular.

Patent EP 3 543 797 describes a timepiece movement with a tourbillon-type regulating mechanism. This tourbillon can be moved linearly so that the planes in which the tourbillon moves are always parallel to each other. This watch-movement has two different kinematic chains. The first is conventional and is responsible for displaying the time. The second kinematic chain is responsible for moving the regulating system in a direction perpendicular to the general plane of the watch-movement.

The movement described in this patent does not allow the axis of the balance to move freely. In fact, all the positions that the balance axis can take are parallel to each other. Furthermore, the two kinematic chains described in the patent are always separate and do not at any time merge to form a single kinematic chain.

DESCRIPTION OF THE INVENTION

The object of the present invention is to propose a watch movement in which a balance-spring is movable in a large number of different positions and orientations, these positions and orientations being chosen by the designer of the movement without being limited by the obligation to follow geometrical rules.

The present invention relates to a movement for a watch-movement as defined in the preamble and characterised in that said movement further comprises

- a locking member for said gear train, said locking member forming part of said first kinematic chain and being arranged to connect or disconnect said first kinematic chain and said second kinematic chain when said locking member is actuated;
- a mobile assembly carrying said regulating assembly;
- a guiding assembly for the mobile assembly, comprising at least one rail;
- a drive mechanism for the mobile assembly arranged to move this mobile assembly along the guide assembly; and
- a mechanism for releasing the locking member.

The present invention also relates to a timepiece comprising a watch-movement as defined above.

In mechanical watches, different organs perform different functions, which are basically the same in all movements. These functions are energy accumulation, counting and transmission, distribution, regulation and, finally, time display. In known watches, the various components that carry out these functions are all continuously kinematically linked to each other in order to guarantee the operation of the watch movement.

In the watch movement according to the present invention, the components performing these various functions are not always kinematically linked to each other, so that at certain moments in the operating cycle of the watch movement, they form two distinct and independent kinematic chains. In particular, this makes it possible to move the components of one of the kinematic chains to any desired position without having to be kinematically linked to the elements of the other kinematic chain for the entire duration of the movement. Nevertheless, the time display and its accuracy can be guaranteed.

According to the invention, it is possible to choose the geometry of the movement of the axis of the balance completely freely, without being limited by the constraints of geometric locus such as straight lines, cones or spheres. In this way, the axis of the balance can assume a large number of different positions and the correction of the isochronism of the timepiece no longer depends on the position of the latter.

The regulating mechanism can be integrated into a wristwatch so that it is visible. The particularly original way in which it works gives the watch a remarkable aesthetic appearance that is completely different from that of known regulating mechanisms.

BRIEF DESCRIPTION OF THE DRAWINGS

The present invention and its advantages will be better understood with reference to the accompanying figures and the detailed description of a particular embodiment, wherein.

EMBODIMENT OF THE INVENTION

Figure 2:
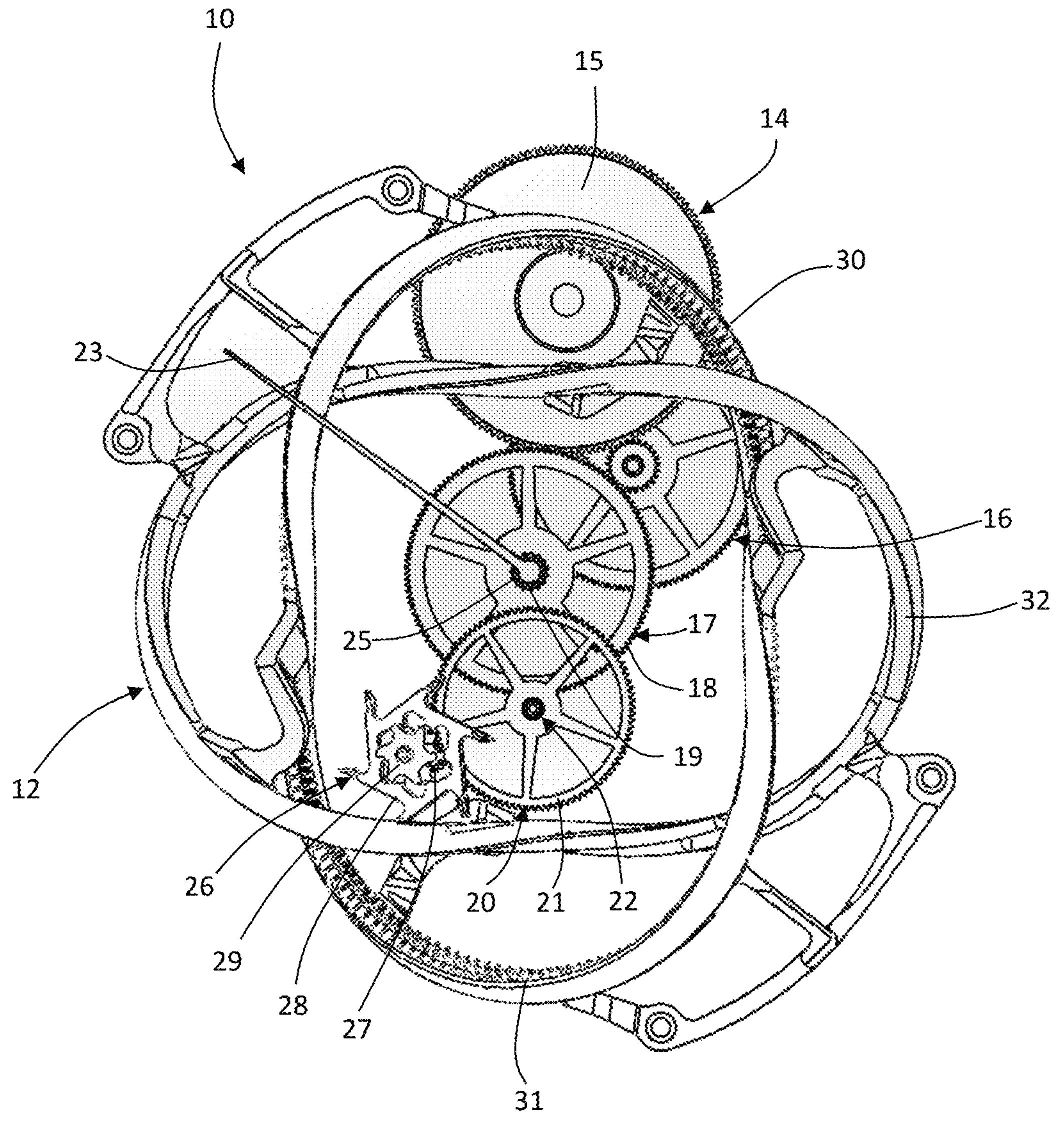
FIG. 2 shows a counting assembly of the watch movement of the invention.

With reference to the figures, the movement of the invention comprises a first assembly, here referred to as the counting assembly 10, which is shown in detail in FIG. 2. This counting assembly performs the functions of energy storage, counting and transmission. The movement of the invention comprises a second assembly, referred to here as the regulating assembly 11 and illustrated in particular in FIG. 3. This regulating assembly performs the functions of distribution and regulation.

The watch movement according to the invention further comprises a guiding assembly 12, shown in particular in FIGS. 1 to 4, and a release mechanism 13, shown in particular in FIG. 4, the functions and structures of which are explained in detail below.

Figure 1:
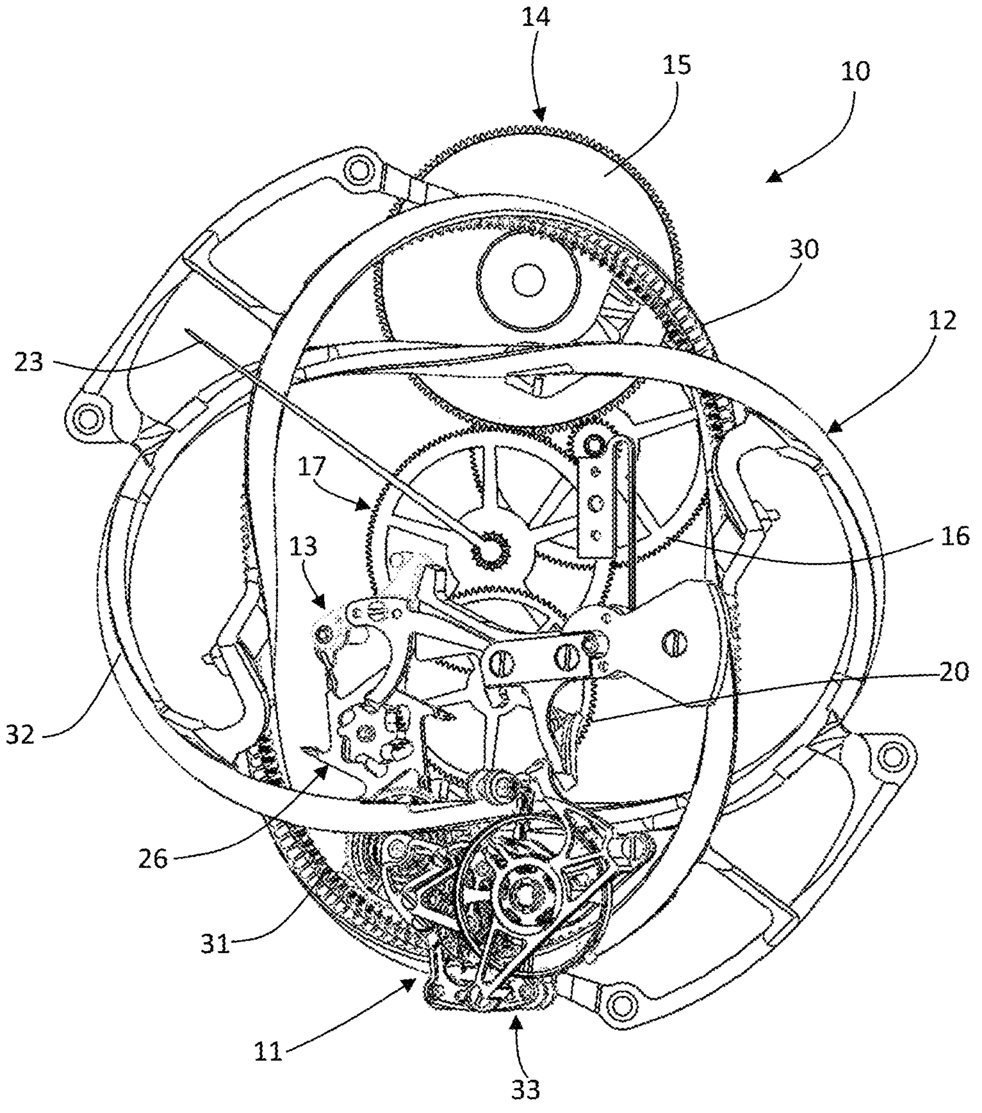
FIG. 1 is a general view of the watch movement according to the invention.

With particular reference to FIGS. 1 and 2, the counting assembly 10 comprises a first energy source 14 which may advantageously be in the form of a conventional barrel 15, i.e. containing a barrel spring. The counting assembly 10 also comprises a gear train 16 supplied with energy by the barrel spring. This gear train 16 may be formed by a central gear 17 comprising a central wheel 18 and a central pinion 19, and by an intermediate gear 20 comprising an intermediate wheel 21 and an intermediate pinion 22. The gear train 16 further comprises at least one minute indicator 23 formed, for example, by a hand carried by a cannon-pinion 25.

The counting assembly 10 of the watch-movement according to the invention comprises an energy transfer gear or transfer gear 26 formed by a connecting pinion 27, which forms a kinematic connection with the gear train 16 of the counting assembly 10 and in particular with the intermediate wheel 21, as shown in FIG. 2. The transfer gear 26 further comprises a toothed transfer wheel 28, the function of which will be explained below. The transfer gear 26 further comprises a transfer pinion provided with return toothing 29. The connecting pinion 27, the return toothing 29 and the transfer wheel 28 are integral so that rotation of one causes rotation of the others.

The counting assembly 10, from the barrel 15 to the transfer gear 26, forms a first kinematic chain of the watch movement according to the invention.

The guiding assembly 12 of the watch movement according to the invention comprises two rails. One of the rails, called the driving rail 30, is provided with a rack 31 and the other rail, called the guide rail 32, is smooth. In a preferred embodiment, these two rails can have any shape, but must always be in a specific geometrical relationship, as described below. These rails are fixed and connected to a plate of the watch-movement.

Figure 3:
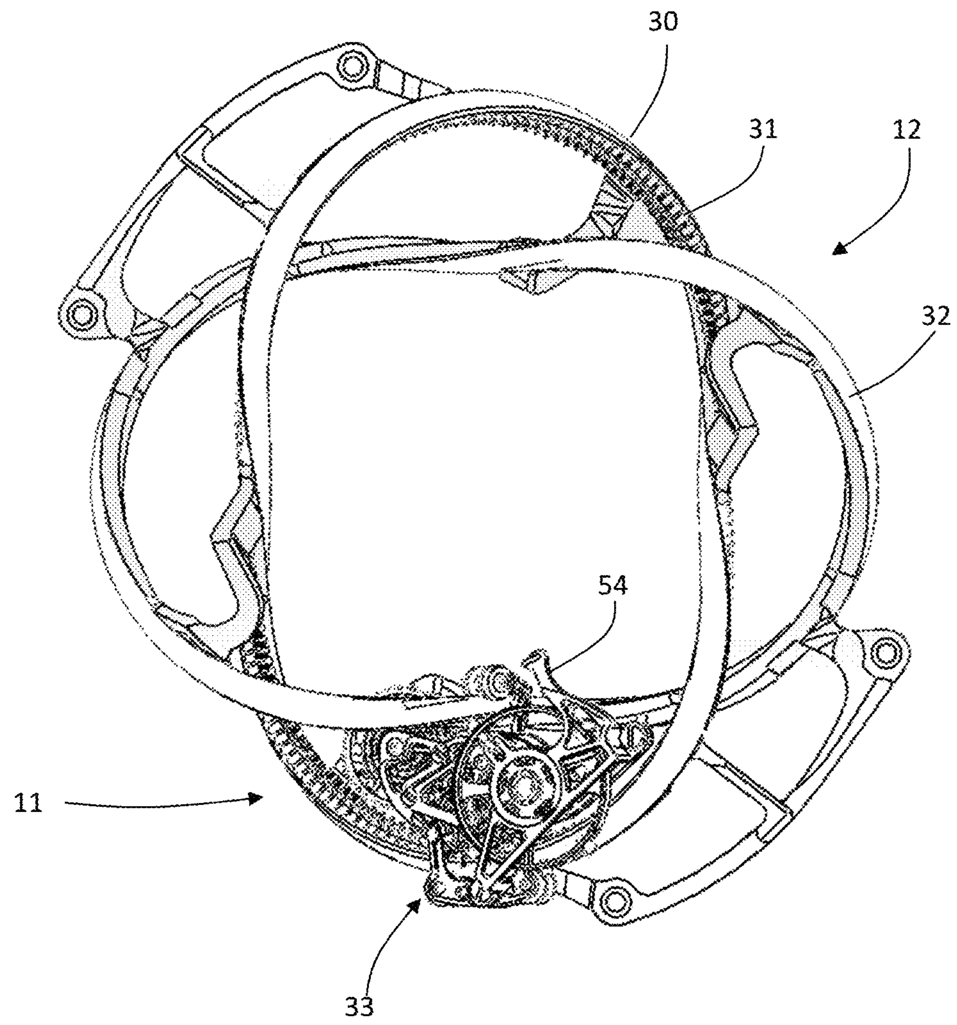
FIG. 3 is a view of a regulating assembly of the watch movement of FIG. 1.
Figure 4:
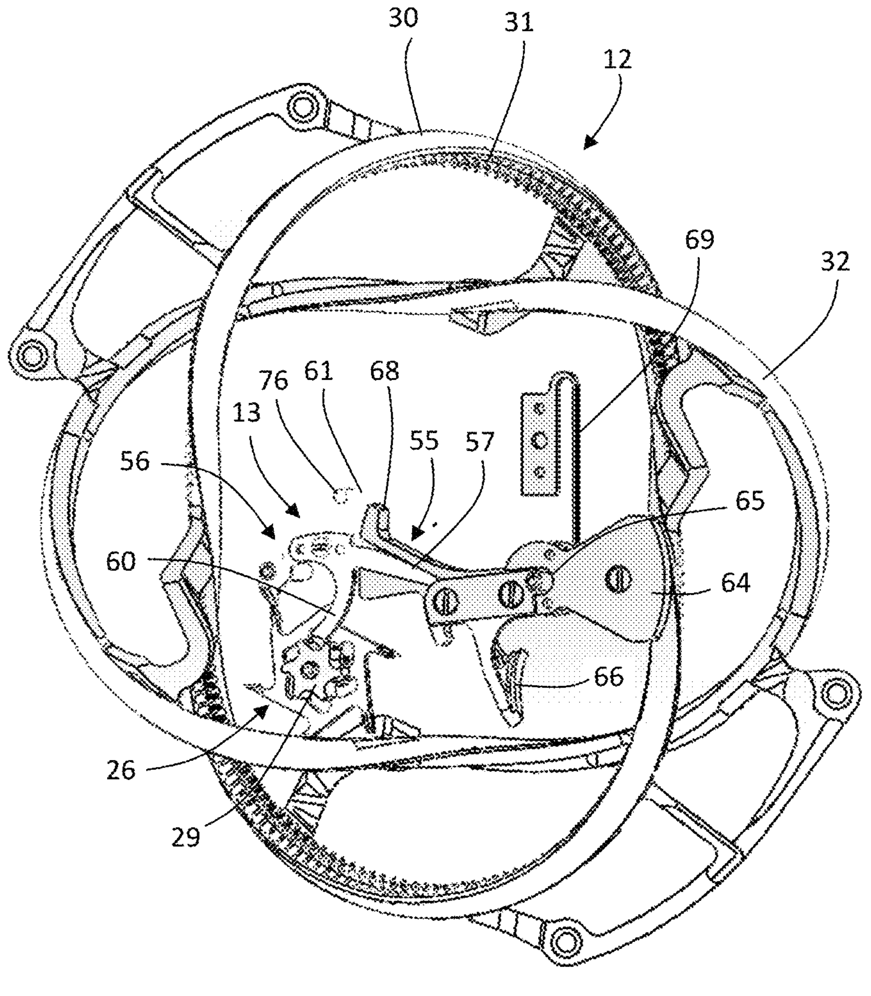
FIG. 4 illustrates a release mechanism for the watch movement according to the present invention.
Figure 5:
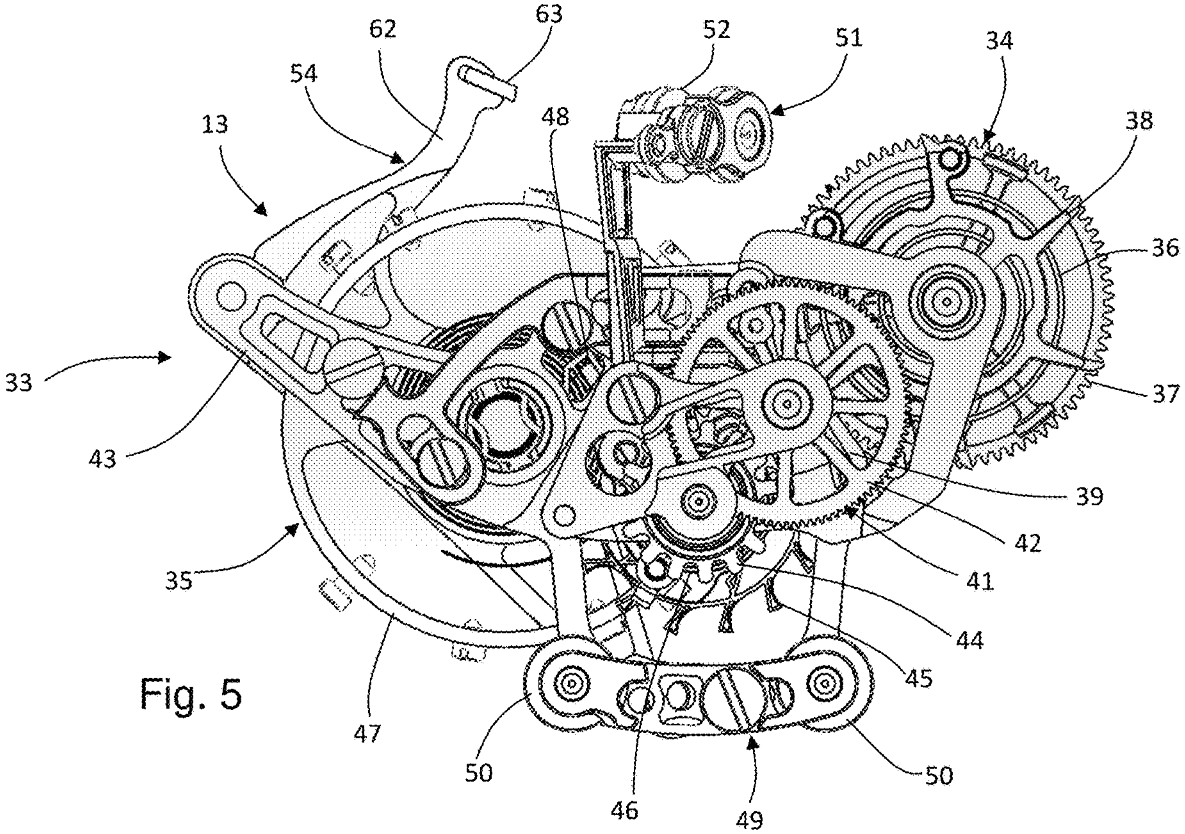
FIG. 5 is a detailed view of a mobile assembly forming part of the watch movement of the invention.
Figure 6:
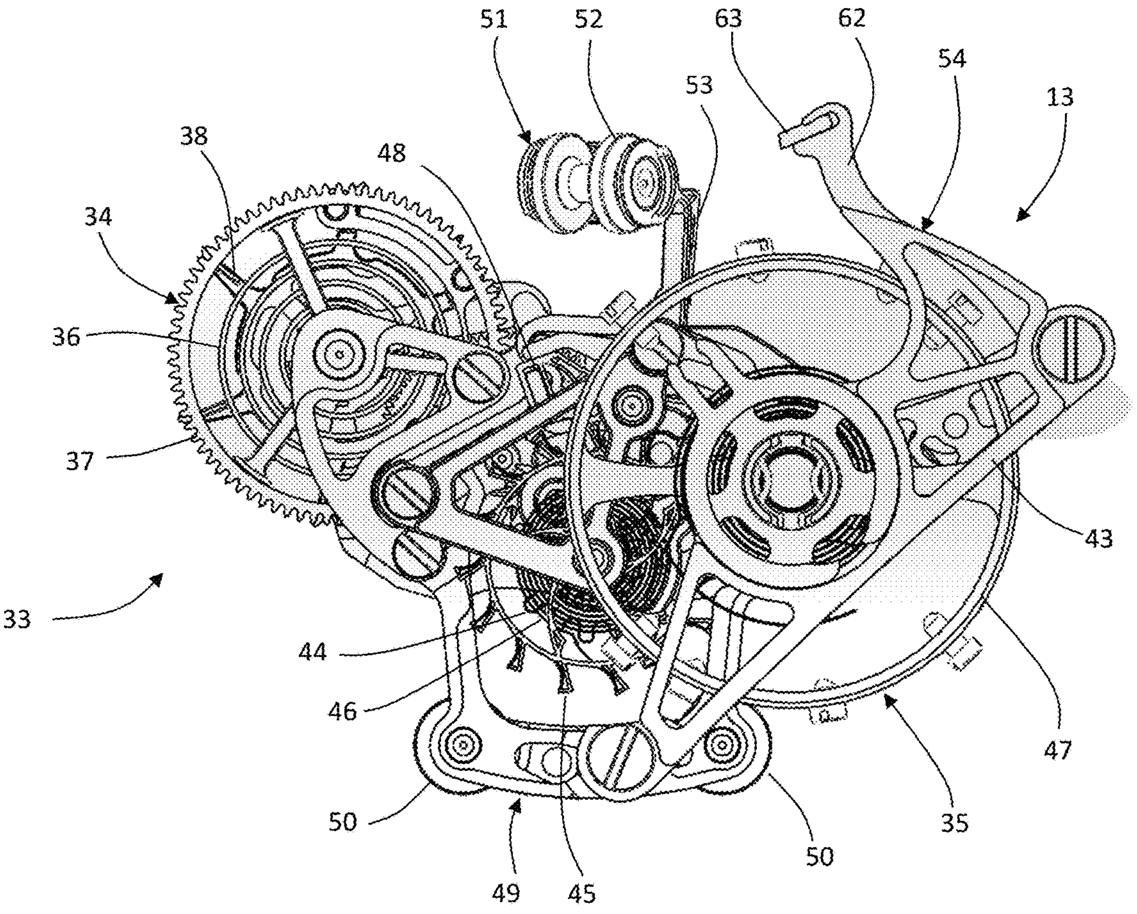
FIG. 6 is a bottom view of the mobile assembly of FIG. 5.
Figure 7:
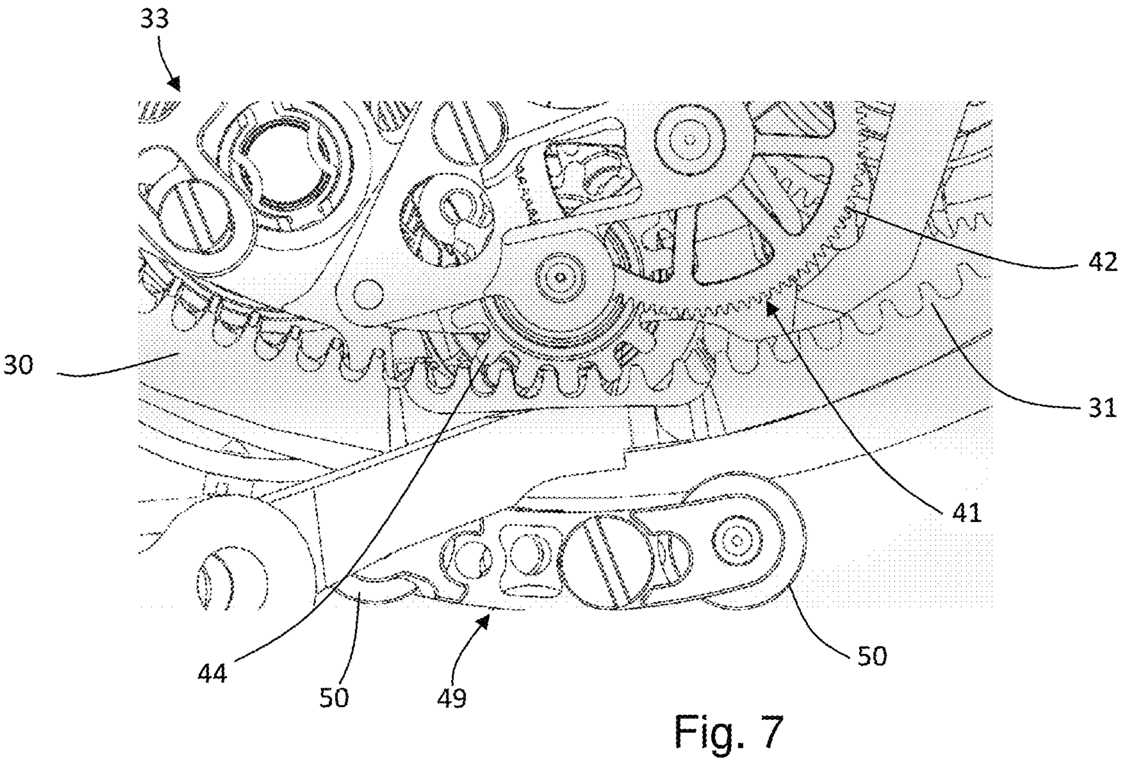
FIG. 7 is a detailed view of a portion of the mobile assembly of FIG. 5.
Figure 8:
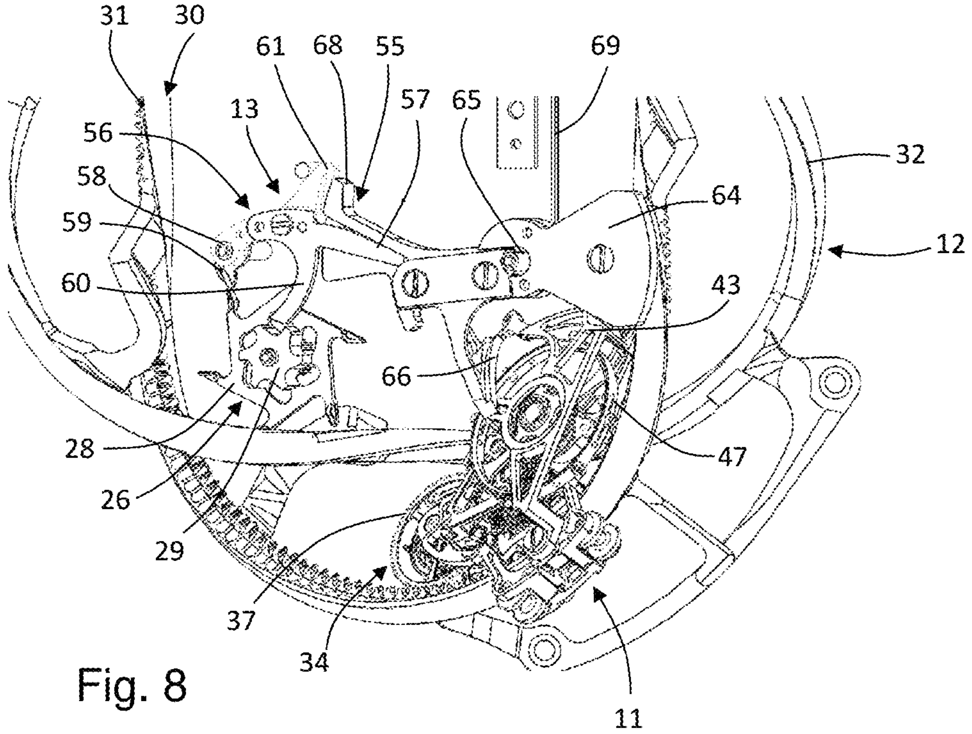
FIG. 8 shows the regulating assembly of FIG. 2 in a first position and the release mechanism of FIG. 4.

The regulating assembly 11 comprises a mobile assembly 33, illustrated in particular in FIGS. 3, 5 and 6. This mobile assembly 33 carries a second energy source 34 and a regulating organ 35. In the embodiment illustrated, this second energy source 34 comprises a spiral spring 36 integral with a toothed ring 37 and an paddle wheel 38. The paddle wheel 38 is kept cocked and in position by a pawl 39. The toothed ring 37 meshes with a pinion of intermediate gear 41. A toothed wheel 42 of this intermediate gear 41 in turn meshes with a pinion of a driving wheel 44 of the mobile assembly 33. This driving wheel 44 meshes with the rack 31 of the driving rail 30 in such a way as to ensure that the mobile assembly 33 moves along the rails when the driving wheel 44 rotates. This is illustrated in particular by FIG. 7. As the rails are fixed relative to a plate of the movement, rotation of the driving wheel 44 causes the mobile assembly 33 to move along the rails.

As can be seen in particular in FIG. 6, the driving wheel 44 is connected to an escapement wheel 45 by a mechanism known as a "constant-force device 46". This escapement wheel 45 cooperates with a balance-spring 47 by means of an anchor 48. The anchor 48 and the balance-spring 47 act in particular as a regulating organ 35 on the movement of the mobile assembly 33, so that this mobile assembly moves in steps, the frequency of which is regulated in particular by the oscillation frequency of the balance-spring 47. In addition to regulating the movement of the mobile assembly 33, the anchor 48 and the balance-spring 47 perform the distribution and regulation functions of a conventional mechanical watch movement.

As mentioned above, the guiding assembly 12 comprises a driving rail 30 provided with a rack 31 and a guide rail 32 along which the mobile assembly 33 moves. In order to ensure constant contact between the driving wheel 44 and the driving rail 30 and to ensure predictable positioning of the mobile assembly 33, this mobile assembly comprises a first carriage 49 provided with at least one double roller 50 intended to bear against the part of the driving rail 30 opposite the rack 31. This mobile assembly 33 also comprises a second carriage 51 also provided with at least one double roller 52 and arranged to bear against the guide rail 32. In a preferred embodiment, one of the carriages comprising a double roller is mounted so as to pivot on a bridge 53 of the mobile assembly, while the other carriage comprises two double rollers 50. The geometric relationship between the two rails of the guiding assembly 12 is such that the total play of the carriages 49, 51 in relation to the rails remains substantially constant whatever the position of the moving assembly and whatever the curvature of the rails. In this way, the mobile assembly 33 remains constantly guided between the driving rail 30 and the guide rail 32 by means of the carriages.

The second energy source 34, the balance spring 47, the driving wheel 44 and the elements kinematically connected to them form a second kinematic chain which is distinct from the first kinematic chain. These two kinematic chains may cooperate at certain times and be independent at other times, as will be explained in detail below.

The release mechanism 13 is carried partly by the mobile assembly 33 and partly by a plate of the watch-movement. The part of the release mechanism carried by the mobile assembly 33 is referred to as the mobile part 54 of the release mechanism. The part of the release mechanism carried by the plate is called the pivoting part 55 of the release mechanism.

This release mechanism 13 comprises a gear locking member 56 arranged to prevent uncontrolled rotation of the gear train 16 of the counting assembly 10. This locking member 56 can act on any moving part of this counting assembly, depending on the construction of the movement. The locking member 56 comprises a clearance arm 57 pivoting about an axis 58 connected to a plate (not shown). This locking member 56 is equipped with a lever 59, a return finger 60 and a safety stop 61.

The mobile part 54 of the release mechanism is illustrated in particular in FIGS. 5 and 6. This mobile part 54 comprises a release arm 62 which is integral with a bridge 43 of the mobile assembly 33. This release arm 62 comprises a lever 63, the function of which is described in detail below.

The pivoting part 55 of the release mechanism is illustrated in particular by FIGS. 8 to 13. This pivoting part 55 comprises a whip 64 mounted on the movement plate so as to be able to pivot freely about a whip axis 65. This whip 64 comprise a ramp 66 whose shape and position are such that it can cooperate with the lever 63 of the release arm 62 when the mobile assembly 33 passes close to this ramp 66. The whip 64 also has a groove 67 in which the clearance arm 57 of the locking member 56 can move. This whip 64 also has a safety shoulder 68 intended to cooperate with the safety stop 61 on the locking member 56, and a return spring 69 intended to return the whip 64 to a rest position.

In order to prevent the locking member 56 from unexpectedly releasing the transfer mechanism 26, for example in the event of an impact, the rotation of the locking member 56 about its axis of rotation 58 is limited by the safety stop 61 which can come to bear against the safety shoulder 68 of the whip 64. The lever 59 of the locking member 56 remains in the path of a first tooth 70 of the transfer gear 26.

When the movement of the timepiece is in operation, the counting assembly 10 is initially held stationary by the locking member 56 of the release mechanism 13.

Figure 12:
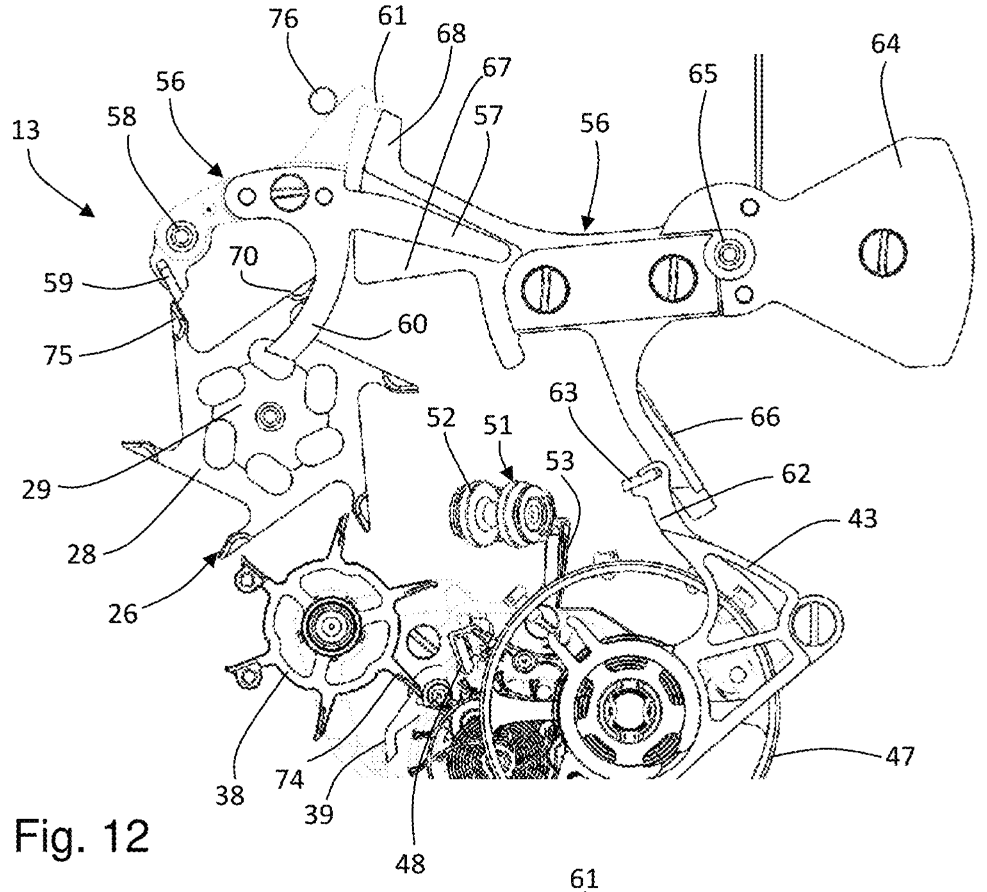
FIG. 12 shows the release mechanism of FIG. 10 in a third position.
Figure 13:
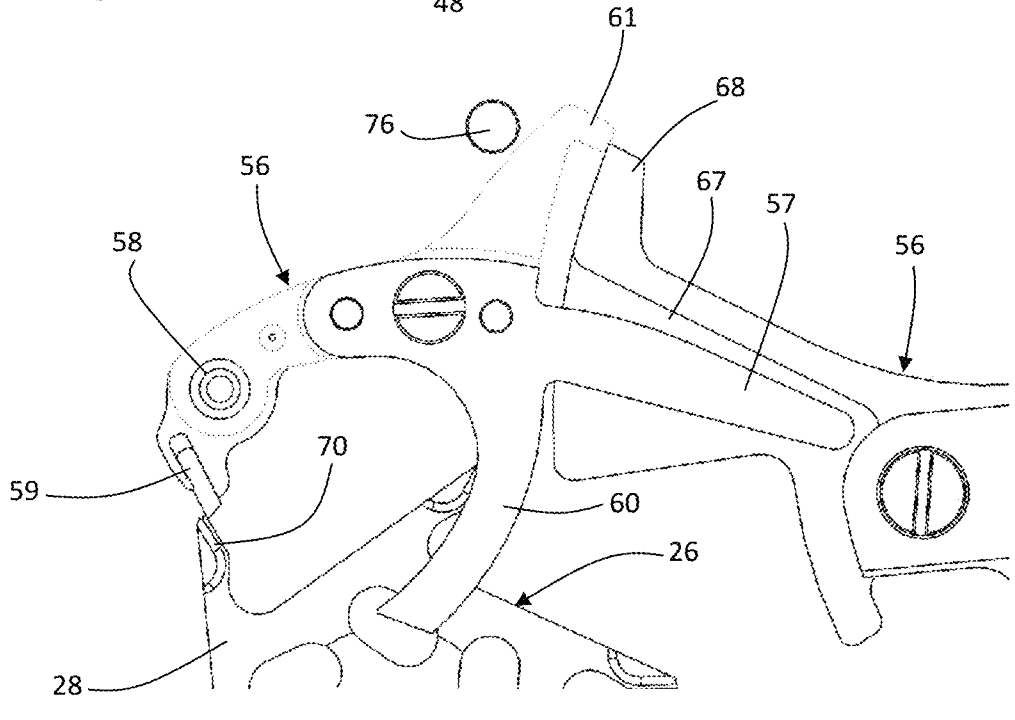
FIG. 13 shows a detail of the release mechanism of FIG. 10 in a fourth position.

In a position known as the blocking position, corresponding to a rest position of the clearance arm 57 of the locking member 56, the lever 59 of this locking member is in contact with the first tooth 70 of the transfer wheel 28 and prevents the transfer gear 26 from rotating about its axis of rotation. The elements forming the first kinematic chain are stationary. This position is illustrated in FIGS. 12 and 13.

Energy is accumulated in the spiral spring 36 of the second energy source 34 of the regulating assembly 11. Said energy causes the balance spring 47 and the anchor 48 to be actuated in the conventional manner.

The energy is also transmitted to the driving wheel 44 of the mobile assembly 33. Thus, at each alternation of movement, the anchor 48 disengages the gear of the mobile equipment and allows the driving wheel 44 to pivot, causing the mobile assembly 33 to move along the driving rail 30 by means of the rack 31. Due to the respective positions of the driving rail 30 and the guide rail 32 and the position of the carriages 49, 51, the mobile assembly 33 is guided along the path defined by the rails. The mobile assembly 33 is moved at a known, constant and predefined speed, which depends in particular on the oscillation frequency of the balance spring 47.

During most of the movement of the mobile assembly 33, the mobile part 54 of the release mechanism does not cooperate with the pivoting part 55 of this release mechanism. The whip 64 is at rest, held in this position by the return spring 69.

Figure 9:
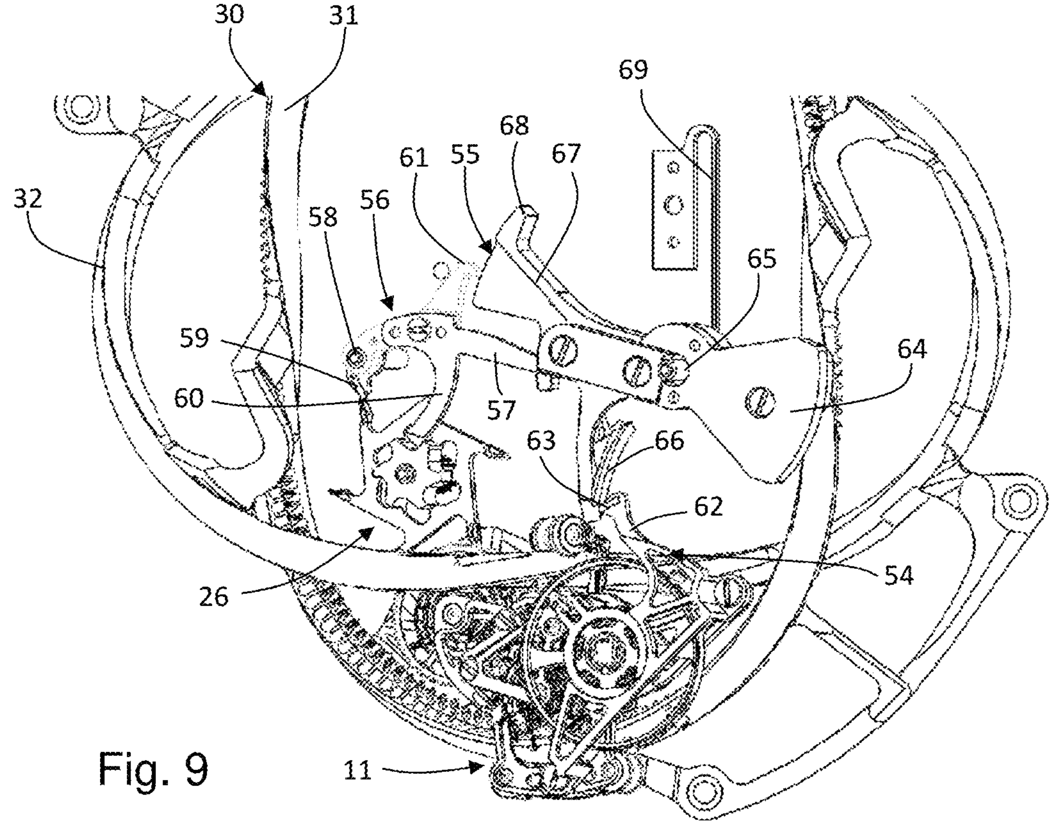
FIG. 9 shows the regulating assembly and release mechanism of FIG. 8 in a second position.

During the movement of the mobile assembly 33, when the latter reaches a predetermined position along its path, as shown in FIG. 9, the release arm 62 of the mobile part 54 of the release mechanism comes into contact with the ramp 66 of the whip 64. The contact of the lever 63 of the release arm 62 with this ramp 66 causes the whip 64 to pivot about its axis of rotation 65. The c arm 57 of the locking member 56 slides in the groove 67 of the whip 64 under the effect of the rotation of the whip about the whip axis 65. The pivoting part 55 of the release mechanism is fully cocked.

Figure 10:
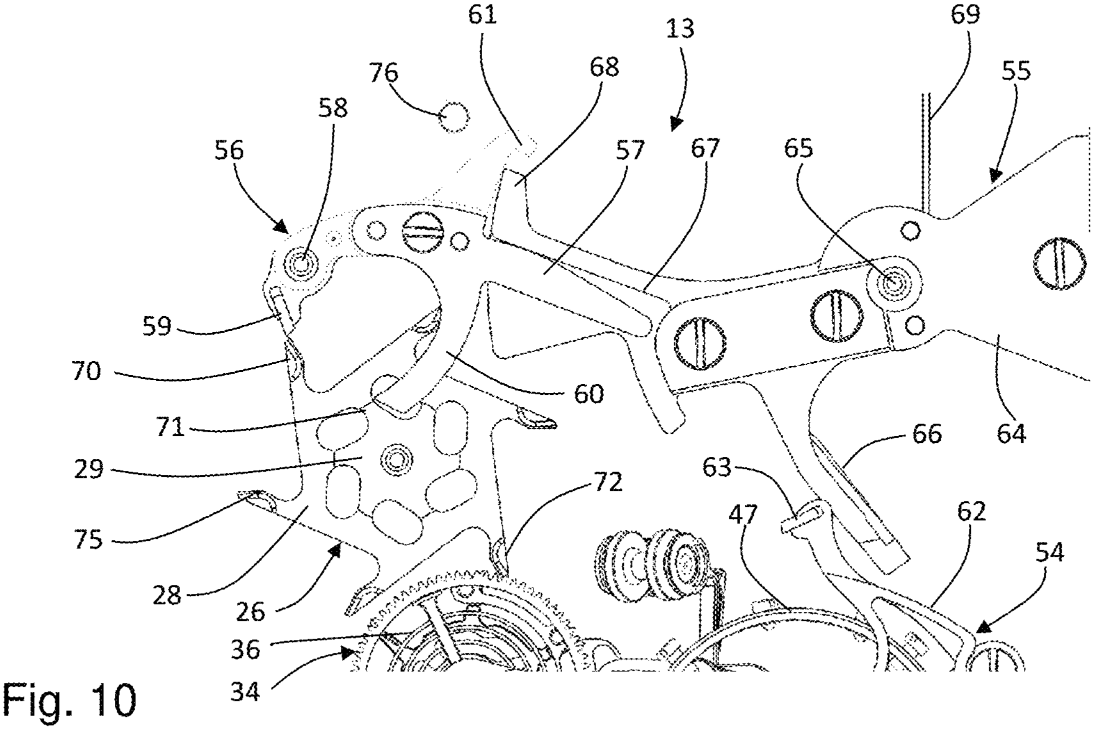
FIG. 10 shows the release mechanism in a first position.

During the further movement of the mobile assembly 33 shown in FIG. 10, the lever 63 of the release arm 62 leaves the ramp 66 of the whip 64. Under the action of the return spring 69, the whip 64 falls back by pivoting about the whip axis 65 and stores energy during its fall so that it moves beyond its rest position. The clearance arm 57 of the locking member 56 comes into contact with the edge of the groove 67. The locking member 56 then pivots about its axis of rotation 58. This causes the locking member 56 to move into a so-called released position, in which the clearance arm 57 is moved so that its lever 59 no longer bears against the first tooth 70 of the transfer wheel 28, creating a backward angle for this transfer wheel. The return finger 60 is positioned between two teeth of the return toothing 29.

Figure 11:
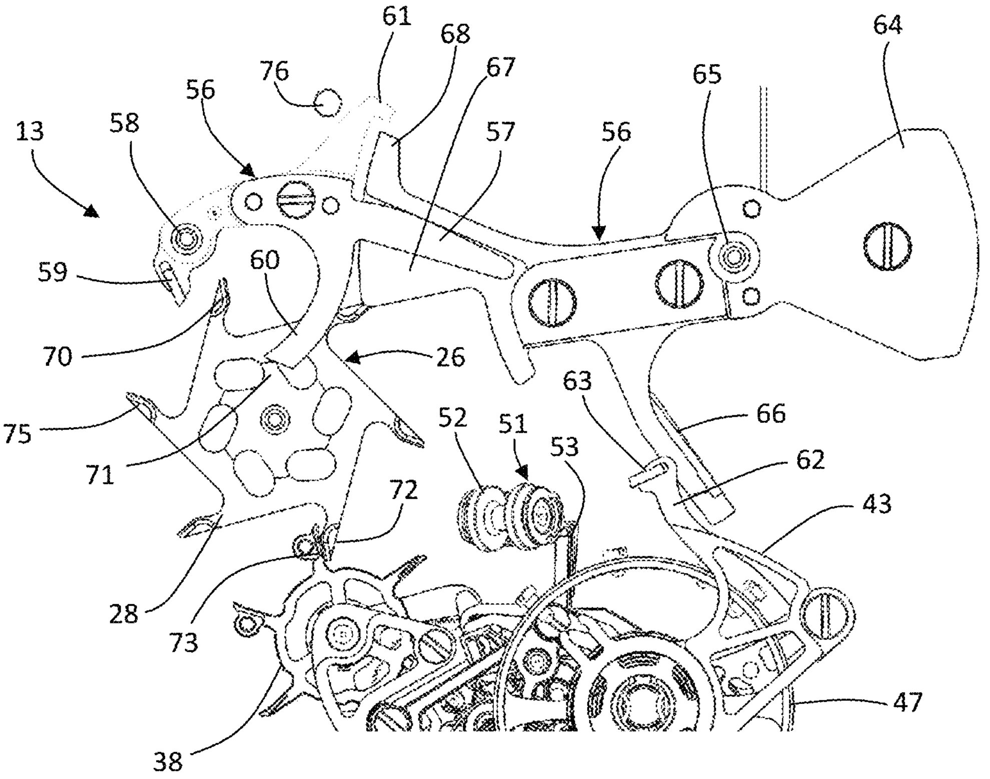
FIG. 11 shows the release mechanism of FIG. 10 in a second position.

The transfer gear 26 can then rotate about its axis under the effect of the force transmitted from the barrel 15 via the gear train 16 and the transfer pinion 29. This position is shown in FIG. 11.

During this rotation, the energy supplied by the barrel 15 to the transfer gear 26 is transmitted to the paddle wheel 38 of the second energy source 34. For this purpose, a third tooth 72 of the transfer wheel 28 comes into contact with a paddle 73 of the paddle wheel 38 of the second energy source. The rotation of the transfer gear 26 rotates the paddle wheel 38 and loads the spiral spring 36 of the second energy source 34.

In principle, the transfer wheel 28 makes a rotation corresponding to one tooth. During this rotation, a second tooth 71 of the return toothing 29 pushes the return finger 60 of the locking member 56. This locking member pivots about its axis 58 to return to its rest position. At the same time, the clearance arm 57 of the locking member rests on the edge of the groove 67 and returns the whip 64 to its rest position.

At the end of this rotation corresponding to one tooth of the transfer gear 26, the locking member 56 returns to a locking position in which a fourth tooth 75 of the transfer wheel 28 bears against the lever 59 of the locking member 56 and the second tooth 71 of the return toothing 29 has pushed the return finger 60 so that the lever 59 is in the path of the fourth tooth 75 of the transfer wheel 28. The fourth tooth 75 presses on the lever 59 and causes the locking member 56 to rotate about the axis 58 so that it comes to rest against a stop 76 on the locking member. The return of the clearance arm 57 to the resting position, in the absence of any stress from the release mechanism 13, prevents the transfer gear 26 from pivoting further. This position is shown in FIG. 12.

The third tooth 72 of the transfer wheel 28 has pushed the paddle 73 so far that one of the paddles 74 locks onto the pawl 39.

When the transfer gear 26 rotates, the energy contained in the first energy source 14 is released and transmitted to the second energy source 34 via the gear train 16, the energy transfer gear 26 and the paddle wheel 38. At this point, the first kinematic chain containing the barrel 15 and the transfer gear 26 and the second kinematic chain containing the second energy source 34 and the escapement are kinematically connected.

The energy transferred from the first energy source 14 to the second energy source 34 is sufficient for the mobile assembly 33 to move sufficiently to bring it to the next location where energy is again transferred from the first energy source to the second energy source.

The release of the locking member 56 also involves the release of the gear train 16 and the displacement of the minute indicator 23 for a time corresponding to the time taken for the mobile assembly 33 to move.

The second energy source 34 can be recharged by alternating the escapement. In this case, the mobile assembly 33 remains stationary during recharging. It can also be recharged during more than one escapement cycle. In this case, the mobile assembly 33 moves during recharging.

When the transfer of energy between the first energy source and the second energy source is complete and the locking member 56 has returned to the position preventing rotation of the transfer gear 26, the two kinematic chains are separated again and no longer interact.

The mobile assembly 33 continues its journey along the rails while the counting assembly 10 remains stationary until the next time the locking member 56 is released.

The assembly comprising the whip 64, the locking member 56 and the transfer gear 26 can be considered as a "recharging station" in the sense that energy is recharged in the second energy source 34 when the mobile assembly 33 comes into contact with the whip.

By way of example, it is possible to dimension the parts so that the mobile assembly 33 completes one revolution of the rails in one minute and a single recharging station is provided. In this case, when the locking member 56 is released, the time indicator, for example the minute indicator 23, is moved through an angle corresponding to one minute.

Contrary to known watch movements, in the movement described here, the counting assembly 10 and the regulating assembly 11 do not always cooperate with each other. In fact, the regulating assembly 11 is autonomous and independent of the counting assembly 10 for the entire distance it travels, except when it cooperates with the whip 64. This independence means that the regulating assembly 11 can be moved along practically any path defined by the rails.

At a certain point along the path of the mobile assembly 33, the counting assembly 10 and the regulating assembly 11 form a single kinematic chain, as in a conventional movement, before separating again.

The invention has been described according to a specific embodiment. However, many variations are conceivable. In the illustrated embodiment, a single "charging station" is provided. However, it is possible to provide several stations along the route taken by the mobile assembly, for example three stations at equal or irregular intervals. In this case, the minute indicator is moved from a position corresponding to 20 seconds or the appropriate duration, each time the counting assembly and the dispensing assembly form the same kinematic chain.

In the embodiment described, the second energy source is supplied by the first energy source. It is possible to use a second independent energy source, which could be mechanical or even electrical.

The guides are represented by roller carriages. However, these carriages could take other forms.

It is also possible to provide a constraint mechanism to ensure that the teeth of the driving wheel always remain in contact on a flank located on the same side of the rack, thus compensating for the play between the teeth.

In principle, each rail forms a closed circuit so that the moving equipment always moves in the same direction. However, it is possible to provide a mechanism that allows the moving equipment to move in two opposite directions. In this case the rails can form an open circuit.

In the example described, the function of transferring energy by means of the transferring mobile and the function of moving the time indicator are linked and are performed when the mobile equipment is in a given position. However, these two functions could be performed independently. For example, the energy transfer function could be performed twice for each revolution of the moving assembly, while the time indicator movement function could be performed once per revolution or three times per revolution.

The invention claimed is:

1. Watch movement comprising:

a counting assembly comprising a first energy source and a gear train kinematically connected to at least one time indicator, this counting assembly forming part of a first kinematic chain; and a regulating assembly comprising a regulating organ and forming part of a second kinematic chain different from the first kinematic chain;

said watch movement further comprises a locking member for said gear train, said locking member forming part of said first kinematic chain and being arranged to connect or disconnect said first kinematic chain and said second kinematic chain when said locking member is actuated;

a mobile assembly carrying said regulating assembly;

a guiding assembly for the mobile assembly, comprising at least one rail;

a drive mechanism for the mobile assembly arranged to move this mobile assembly along the guide assembly; and a release mechanism for releasing the locking member.

2. Watch-movement according to claim 1, wherein the guiding assembly comprises at least one driving rail provided with a rack.

3. Watch movement according to claim 2, wherein the mobile assembly comprises at least one carriage holding said mobile assembly between said driving rail and at least one guide rail.

4. Watch movement according to claim 2, wherein the drive mechanism of the mobile assembly comprises a driving wheel meshing with the rack of the driving rail, this driving wheel being kinematically linked to the regulating organ.

5. Watch movement according to claim 1, wherein the guiding assembly comprises at least one guide rail.

6. Watch movement according to claim 1, wherein the release mechanism comprises a mobile part carried by the mobile assembly and a pivoting part carried by a plate of the watch movement.

7. Watch movement according to claim 6, wherein the pivoting part of the release mechanism comprises a whip pivoting about a whip axis integral with a plate, and a clearance arm.

8. Watch movement according to claim 7, wherein the whip comprises a ramp arranged to cause the whip to pivot about the whip axis when the mobile part of the release mechanism acts on the ramp.

9. Watch movement according to claim 8, wherein the mobile part of the release mechanism comprises a release arm arranged to actuate the ramp of the pivoting part of the release mechanism during the displacement of the mobile assembly along the guiding assembly.

10. Watch movement according to claim 6, wherein the locking part of the release mechanism comprises a lever acting on a transfer gear and actuated by a clearance arm.

11. Watch movement according to claim 1, wherein the counting assembly comprises at least one transmission gear kinematically connected to the first energy source and in that the locking member acts on the transmission gear.

12. Watch movement according to claim 1, wherein the regulating assembly comprises a second energy source.

13. Watch movement according to claim 12, wherein the second energy source comprises a spiral spring kinematically connected to a paddle wheel.

14. Watch movement according to claim 12, wherein the watch movement comprises at least two energy transmission mechanisms arranged to transmit energy from the first energy source to the second energy source.

15. Watch comprising a watch-movement according to claim 1.

* * * * *